United States Patent [19]
Ovadia

[11] Patent Number: 5,461,862
[45] Date of Patent: Oct. 31, 1995

[54] SYSTEM FOR CONVERSION OF SEA WAVE ENERGY

[76] Inventor: Shmuel Ovadia, 19 Lobetkin, Tel Aviv, Israel

[21] Appl. No.: 135,516

[22] Filed: Oct. 13, 1993

[51] Int. Cl.$^6$ .................................................. F03G 7/00
[52] U.S. Cl. ............................................ 60/641.9; 60/502
[58] Field of Search ............................... 60/641.9, 398, 60/495, 499, 502, 503; 415/110

[56] References Cited

U.S. PATENT DOCUMENTS

| | | | |
|---|---|---|---|
| 960,478 | 6/1910 | Allard | 417/100 |
| 1,008,683 | 11/1911 | Wall | 417/100 |
| 1,331,209 | 2/1920 | Phillips | 417/100 |
| 3,149,776 | 9/1964 | Parrish | 417/100 |
| 3,685,291 | 8/1972 | Fadden, Jr. | 417/100 |
| 4,022,549 | 5/1977 | Gregg | 417/100 |
| 4,078,871 | 3/1978 | Perkins, Jr. | 60/398 |
| 4,231,712 | 11/1980 | Shing-Hsizing | 417/100 |
| 4,263,516 | 4/1981 | Papadakis | 60/398 |
| 4,400,940 | 8/1983 | Watanabe et al. | 417/330 |
| 4,563,591 | 1/1986 | Jones | 417/330 |
| 5,052,902 | 10/1991 | Labrador | 417/330 |
| 5,066,867 | 11/1991 | Shim | 290/53 |
| 5,084,630 | 1/1992 | Azimi | 290/53 |
| 5,094,595 | 3/1992 | Labrador | 417/332 |
| 5,211,545 | 5/1993 | Storres | 417/100 |

*Primary Examiner*—Ira S. Lazarus
*Assistant Examiner*—L. Heyman
*Attorney, Agent, or Firm*—Mark M. Friedman

[57] ABSTRACT

A system for the conversion of sea wave energy including a breakwater structure including a wave energy collector integrally formed within the breakwater structure. The energy collector collects and directs oncoming waves to an upwardly extending duct having hydraulic oil separated from seawater by a membrane for converting the wave energy into oil pressure. The wave energy collector incorporates a plurality of control valves which are electronically coupled through a computerized control system which regulate the control valves so that the optimum wave pressure is collected and transferred to the hydraulic oil. A piping system conducts the pressurized hydraulic oil to a pressure tank which is connected to a hydraulic motor which is mechanically coupled to an electric generator. The system may be combined with a solar distillation apparatus.

11 Claims, 4 Drawing Sheets

5,461,862

SYSTEM FOR CONVERSION OF SEA WAVE ENERGY

FIELD OF THE INVENTION

The present invention relates to the utilization of energy from sea waves and particularly to apparatus for converting sea wave energy to electrical power.

BACKGROUND OF THE INVENTION

The utilization of the energy produced by the ebb and flow of sea waves has been the subject of numerous and varied proposals. Apparatus has been proposed, comprising machines which float or are fixed to the sea floor and which convert the wave energy into storable form such as compressed air using piston compressors (U.S. Pat. Nos. 5,094,595 and 5,052,902).

Other devices, use floating bouys or bladders which oscillate vertically, in step with forces produced by the waves. The hydraulic pump discharges into an accumulator which then delivers fluid to an electric generating station. Attempts to convert the wave force, generated by the rise and fall of the flotation bladders, to electric energy have been made using the rotation force of gears connected by ropes to the flotation bladders (U.S. Pat. No. 5,066,867).

The disadvantage of apparatus that relies on floating members is that the amount of sea wave energy absorbed by the member is dependent on the location of the member in relation to the cycle of the sea wave and thus is not a consistent or efficient method of utilizing the full power of the sea wave. Furthermore, accurately siting the floating members is itself problematic and apparatus that is tethered to the sea bed can become free, thus negating the value of these floating members.

Various solutions have been suggested including the use of wave transducers connected to computers in order to accurately control the movement of the floating members (U.S. Pat. No. 4,023,294). To automatically compensate for variations in flow rate, height as well as the variation in velocity of waves and sea level, a system has been proposed (U.S. Pat. No. 5,084,630), using paddle and hydraulic cylinder units operating hydraulic pump which discharges to an accumulator which delivers fluid to an electric generator station.

These solutions have the disadvantage of requiring sophisticated electronic equipment which is subject to breakdown, inefficient and costly to install and maintain. Apparatus which is situated away from the shore requires expensive equipment in order to convert the wave energy and transfer it to the shore and thence in the form of electricity to the consumer.

There is thus a widely recognized need for, and it would be highly advantageous to have an efficient and inexpensive method of converting the energy produced by sea waves into consumable electricity.

SUMMARY OF THE INVENTION

According to the present invention there is provided a system for the conversion of sea wave energy comprising a breakwater structure, wave energy collecting means integrally formed within the said breakwater structure, means for converting said wave energy into oil pressure through a piping system wherein the sea wave energy is trapped by the said breakwater structure means and the said energy collecting means incorporate a plurality of control valves, electronically coupled through computerized controls, said computerized controls regulating the said control valves so that the optimum wave pressure is collected and transferred to the hydraulic oil pressure within the said piping system into a hydraulic oil pressure tank, and a hydraulic motor is mechanically coupled to an electric generator so that electricity is produced as the oil pressure within the said pressure tank operates the said hydraulic motor.

According to further features in preferred embodiments of the invention described below, the collection of wave energy is improved by means of a network of wave sensors attached to the said breakwater structure means at a distance therefrom and electrically coupled to said computerized controls.

According to still further features in the described preferred embodiments, the control valves are two-way valves which permit the release of energy expended sea water back into the sea, and the released sea water is prevented from impeding incoming waves by means of suitably designed drainage pipes.

According to another embodiment, wave energy collecting means comprise an arrangement of pipes including at least one non-return valve, extending vertically and discharging into a storage receptacle above sea level and from whence pressure is transferred to the said hydraulic oil pressure tank through gravitational means.

According to another embodiment, solar distillation means comprises cooling and heating means connected to a turbine mechanically coupled to an electric generator thereby producing electricity and wherein said heating and cooling means desalinate the sea water, the said heating means comprising a chamber covered by a protective covering through which at least one pipeline, containing sea water pressured through the said pipeline by the said sea wave energy forces, is heated by the action of solar rays thereby producing steam which is used to drive the said turbine, and the said heating means further comprises electrical heating elements to supplement the solar heating and thereby increase the quantity of steam produced. The said cooling means comprise an open chamber through which at least one pipeline, containing steam expelled from the said turbine is cooled by the action of sea water.

BRIEF DESCRIPTION OF THE DRAWINGS

The invention is herein described, by way of example only, with reference to the accompanying drawings, wherein.

DETAILED DESCRIPTION OF THE PREFERRED EMBODIMENT

Figure 1:
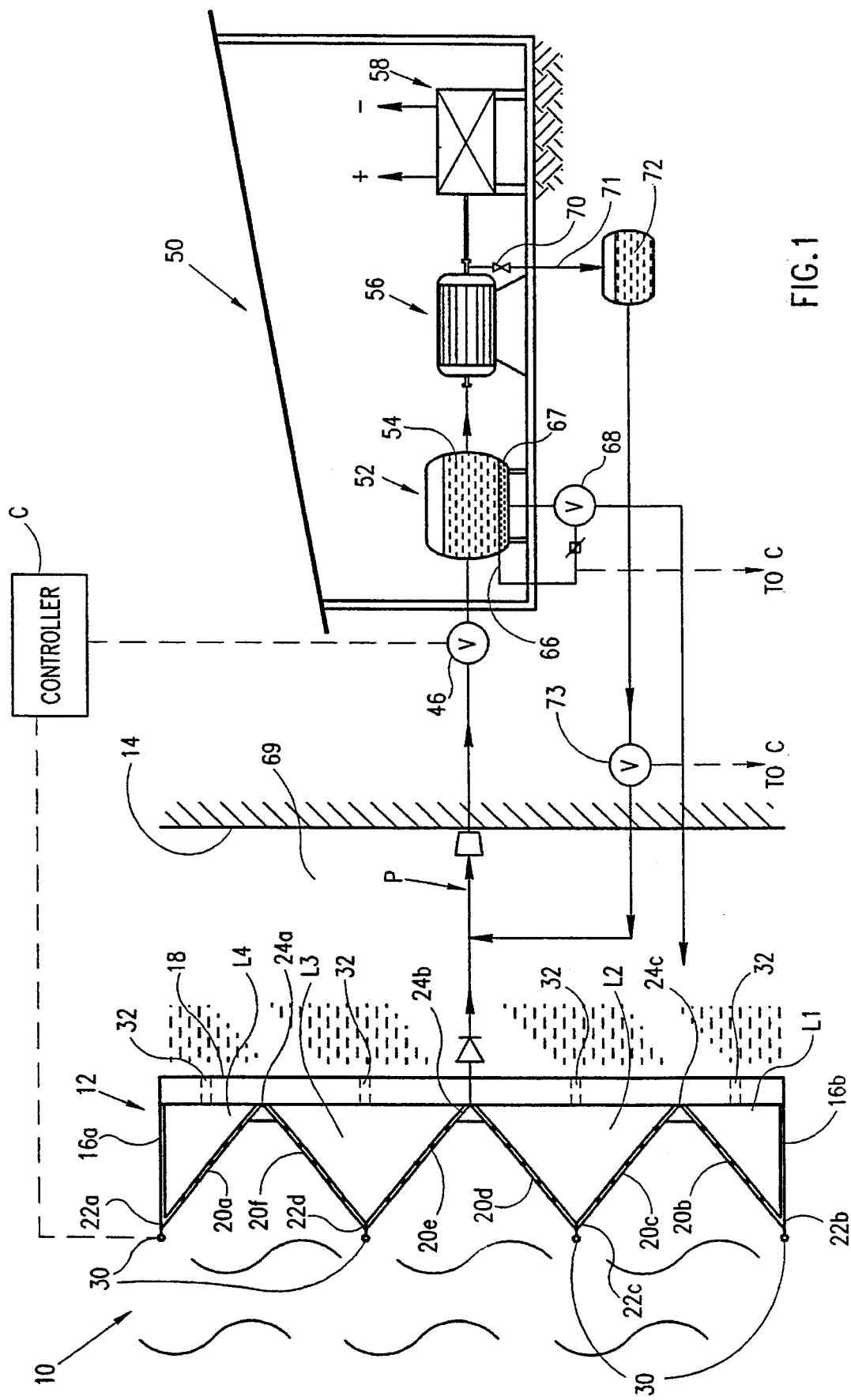
FIG. 1 is a schematic diagram of the proposed system for conversion of sea wave energy to electrical power according to a preferred embodiment of the present invention.
Figure 2:
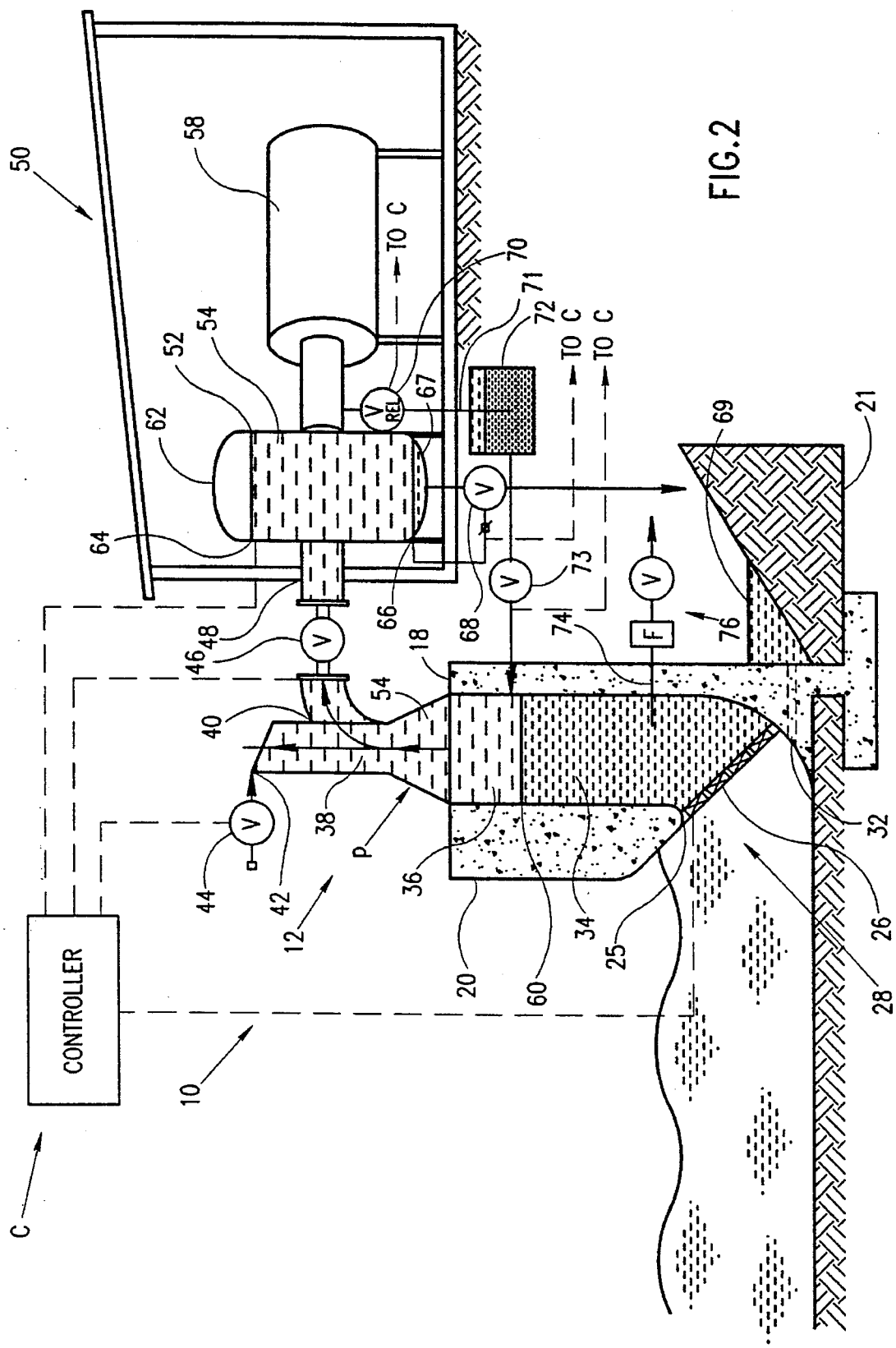
FIG. 2 is a partial sectional view of the system of FIG. 1.

Referring to FIGS. 1 and 2, there are schematically shown the main components of the sea wave energy conversion system, generally denoted 10. A breakwater, generally denoted 12, preferably built of concrete or similar material, is constructed close to the sea shore 14. The breakwater 12 is constructed of concrete or similar material and comprises a first and second outer wing walls 16a and 16b, perpendicular to the main inner breakwater wall 18 and a plurality of weir walls 20. The inner wall 18 is set into the sea bed 21 and acts as a retaining wall. The level of the bottom of weir wall 20 is set at the maximum wave height H1, and is contoured in a bullnose fashion to prevent erosion due to the force of the sea waves and to reduce wave energy losses.

The breakwater 12 is shown having a length L. This length is not restricted to any maximum length and for purposes of illustration is shown as being divided into four partitions, first and second outer partitions, denoted L1 and L4 and first and second intermediate partitions, denoted L2 and L3. Each outer partition L1 and L4 is triangular in plan view comprising outer wing wall 16a (or 16b), main inner breakwater wall 18 and a third weir wall 20a (or 20b), one end of which 22a (or 22b) adjoins outer wing wall 16a (or 16b) and the other end of which 24a (or 24b) adjoins inner breakwater wall 18. Each intermediate partitions, L2 and L3 forms an isosceles triangle when viewed in plan and comprises inner wall 18 and first and second weir walls 20c and 20d (or 20e and 20f). One end of first and second weir walls 20c and 20d (or 20e and 20f) abuts inner wall 18, forming a junction 24 (24a, 24b, 24c) with the corresponding weir wall (that is, weir walls 20a and 20f meet at junction 24a, weirs wall 20e and 20d meet at junction 24c and weir walls 20b and 20c meet at junction 24b). The other end 22c (or 22d) of each weir wall 20 is joined one to the other, forming a right-angle in plan view.

Inner wall 18 is archoid in shape at its lower end 25, below the minimum sea level, close to the sea bed 21 to prevent the deposition of silt and sand and to further reduce wave energy losses.

A plurality of two-way valves 26 electrically coupled to computerized controls, generally designated C, set within a concrete valve wall 28, which acts as a collector of waves approaching the weir. Concrete valve walls 28 are attached to the bottom of weir walls 20, at level height H and to inner wall 18. Two-way valves 26 permit the entry of the sea water waves and the release of any excess.

A network of wave sensors 30 are attached to outer wall 16 at level height H at the junction 22 of weir walls 20. The wave sensors 30 are sited at a calculated distance from outer wall 16 in order to sense the force and height of the incoming waves and are electrically coupled to computerized controls C.

Inlet pipelines 32 are constructed within the breakwater 12 preferably below the junction points 24 of weir walls 20.

Waves which approach the shore 14 are sensed by wave sensors 30 and with the aid of computerized controls C, the wave energy is assessed. Waves having sufficient energy to meet pre-determined criteria are allowed to pass through the two-way valves 26, which automatically open, into storage chamber 34. Storage chamber 34 is formed within the breakwater 12, bounded by main inner breakwater wall 18, weir walls 20 and outer wing walls 16.

Within the storage chamber 34, there is constructed a duct 36. At the exit from storage chamber 34, a piping system, generally denoted P is fitted to the storage chamber 34. The piping system P comprises a tapered duct 36, coupled to a reducer 38 whose diameter is approximately one half the diameter of duct 36, which is coupled to a right-angled junction pipe 40. At the upper open end 42 of right-angled junction pipe 40, a control valve 44 is fitted. Similarly, a second control valve 46 is fitted to the angled pipe. Both first and second control valves 44 and 46 are electrically coupled to computerized controls. A pipeline 48 extends from second control valve 46 to the electricity generating station, denoted 50. In the preferred embodiment, the pipe 40 is sealed and control valve 44 is replaced by a stop valve. The vertically extending pipe is only used for pumping sea water up to a storage chamber high above sea level, as will be described hereinbelow.

The electricity generating station 50, comprises a pressure tank 52 filled with a suitable hydraulic oil 54, which is mechanically coupled to a hydraulic motor 56. The hydraulic motor 56 is coupled to and drives a generator 58.

In operation, the piping system P from duct 36 within storage chamber 34 via reducer 38 and right-angled junction pipe 40 to pressure tank 52 is filled with oil 54. The oil is retained within duct 36 by means of a oil/water membrane 60 which is tightly fitted by means of a rubber O-ring (not shown) or similar to the open lower end of duct 36. The upper portion of the pressure tank 52 contains air 62. The air pressure is constantly monitored by means of a pressostat 64 coupled to computerized controls C. A regulating device 66, electrically coupled to computerized controls C, is fitted to the lower portion of pressure tank 52 in order to check the volume of sea water 67 which may have separated from the oil 53 and settled to the bottom of the pressure tank 52. The sea water 67 is drained to the sea, from the pressure tank 52 by means of a pipe connected to a control valve 68, which is electrically coupled to the regulating device 66 and to the computerized controls C.

In operation, the sea waves constantly rising and falling approach the sea shore and are monitored by wave sensors 30 and recorded by the computerized controls C. Initially, storage chamber 34 is empty. The piping system P from the duct 36 to the pressure tank 52 is filled with oil 54 and retained by the oil/water membrane 60. When waves having the required energy are sensed, the two-way valves 26, within concrete valve wall 28, are opened on instruction from the computerized controls C. The energy of the waves forces the sea water into the storage chamber 34. The two-way valves 26 are then closed retaining the sea water within storage chamber 34. Depending on the force of the waves approaching the weir wall 20 and the data transmitted by the wave sensors 30, the two-way valves 26 are opened allowing further sea water to enter storage chamber 34. When sufficient sea water has entered and filled storage chamber 34, the force of the next wave exerts an upward pressure on oil/water membrane 60. This force is transferred through the oil 54 within the piping system P into the pressure tank 52. The oil pressure drives a hydraulic motor 56 which further drives a generator 58, thus producing electricity.

After the waves have used their energy to force the hydraulic oil 54 upwards, the two-way valves 26 are opened and the sea water within storage chamber 34 is returned to the sea. However, in order to prevent the returning sea water from impeding the progress and reducing the force of the incoming sea waves, the sea water may be diverted via pipes, denoted 32 built into the inner wall 18, to shallow pools 69 on the sea shore side of the breakwater 12. The sea water in shallow pools 69 returns to the sea during periods of low wave activity.

Though the oil and water are immiscible and as water is heavier than oil, water will naturally settle to the bottom of any mixture containing both oil and water, the force and the turbulence generated by the action of the sea waves may cause some of the oil to become contaminated with sea water and vice versa. Means to separate the oil from the sea water are an integral part of the system. Sea water which has become mixed with the hydraulic oil 54 notwithstanding the presence of the oil/water membrane 60 is simply separated out within the pressure tank 52 by settling to the bottom of the pressure tank 52 and being drained off via control valve 68 and returned to the sea. A pressure relief valve 70 is coupled downstream of the pressure tank 52 and opens automatically whenever the pressure of the hydraulic oil 54 exceeds pre-determined parameters. The excess oil is drained via a pipe 71 into an oil storage container 72. A second valve 73 downstream of the oil storage container 72 allows the excess oil to be returned to the duct 36 above the oil/water membrane 60. To separate any oil which may have contaminated the sea water within storage chamber 34, it is necessary to drain all the sea water within the storage chamber 34. This is achieved by draining the sea water via an outlet pipe 74 incorporated within the inner concrete breakwater wall 18 and separating the oil from the sea water using filtration means, denoted 76, before allowing the sea water to return to the shore.

Figure 3:
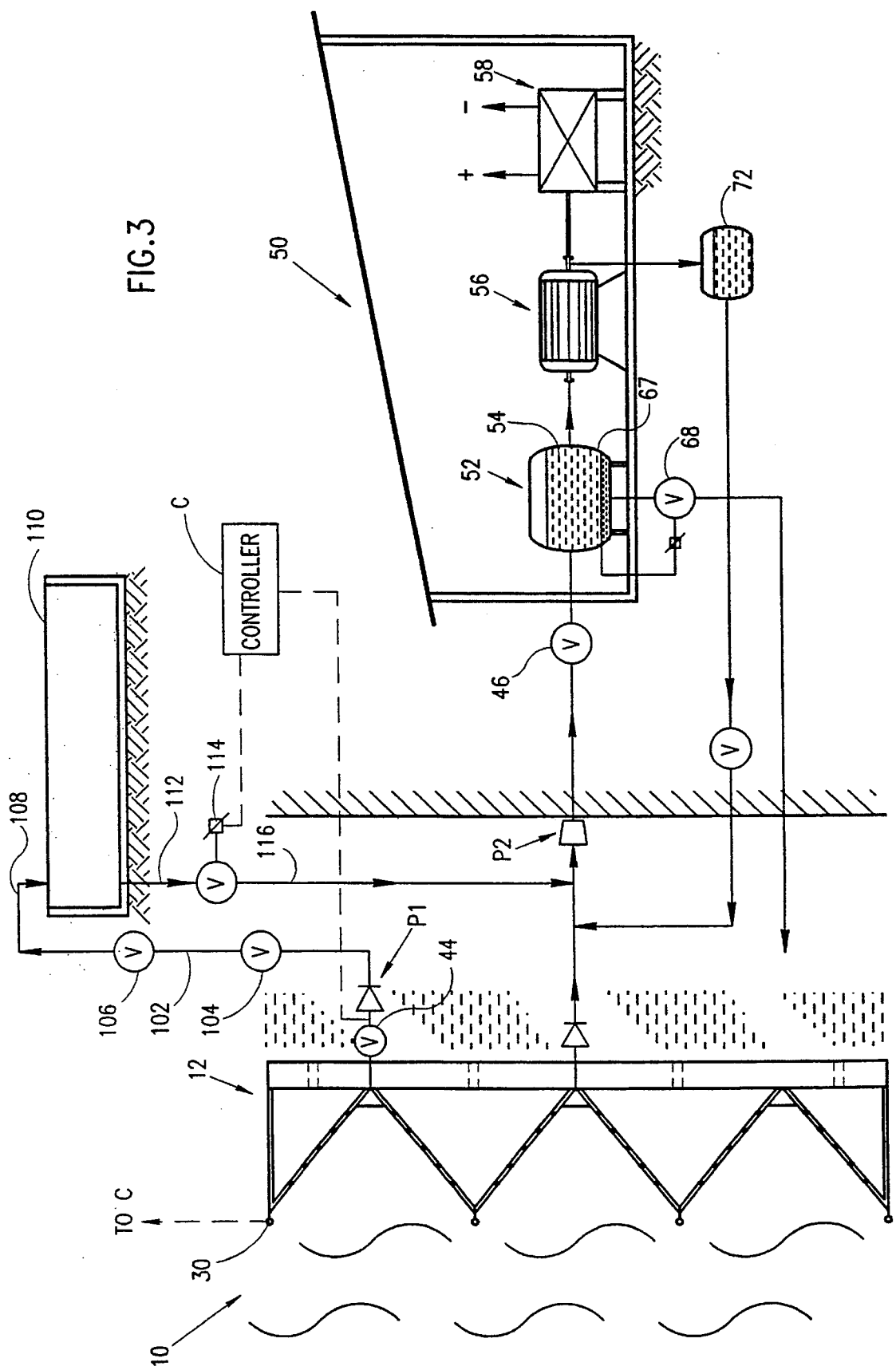
FIG. 3 is a schematic diagram of an alternative embodiment of the system of FIG. 1

In a further developed embodiment of the system, surplus sea wave energy is exploited to pump the sea water high above sea level. The static sea water pressure is then utilized during periods of low wave energy to replace the sea wave energy. Referring to FIG. 3, a pipeline 102, equipped with first and second non-return valves 104 and 106 is welded or otherwise coupled to the closed-off end of the pipe 40, upstream of control valve 44. Pipeline 102 extends vertically and by means of suitably angled bends 108, discharges into a storage receptacle 110 situated high above sea level. The storage receptacle 110 is provided with a pipe outlet 112. Downstream of pipe outlet 112, a control valve 114 electrically coupled to computerized controls C regulates the outflow from storage receptacle 110. The sea water acting under gravitational forces flows via a pipeline 116 into the storage chamber 34 and the gravitational forces of the sea water pressures the hydraulic oil 54 within the system as hereinbefore described. In this case, the piping system P1, comprising storage chamber 34, duct 36, reducer 38 and right-angled junction pipe 40 is not filled with hydraulic oil. As will be appreciated by those knowledgeable in the art, the height attainable by the sea water acting under wave pressure is independent of the diameter of the pipe leading up to the storage receptacle 110.

Figure 4:
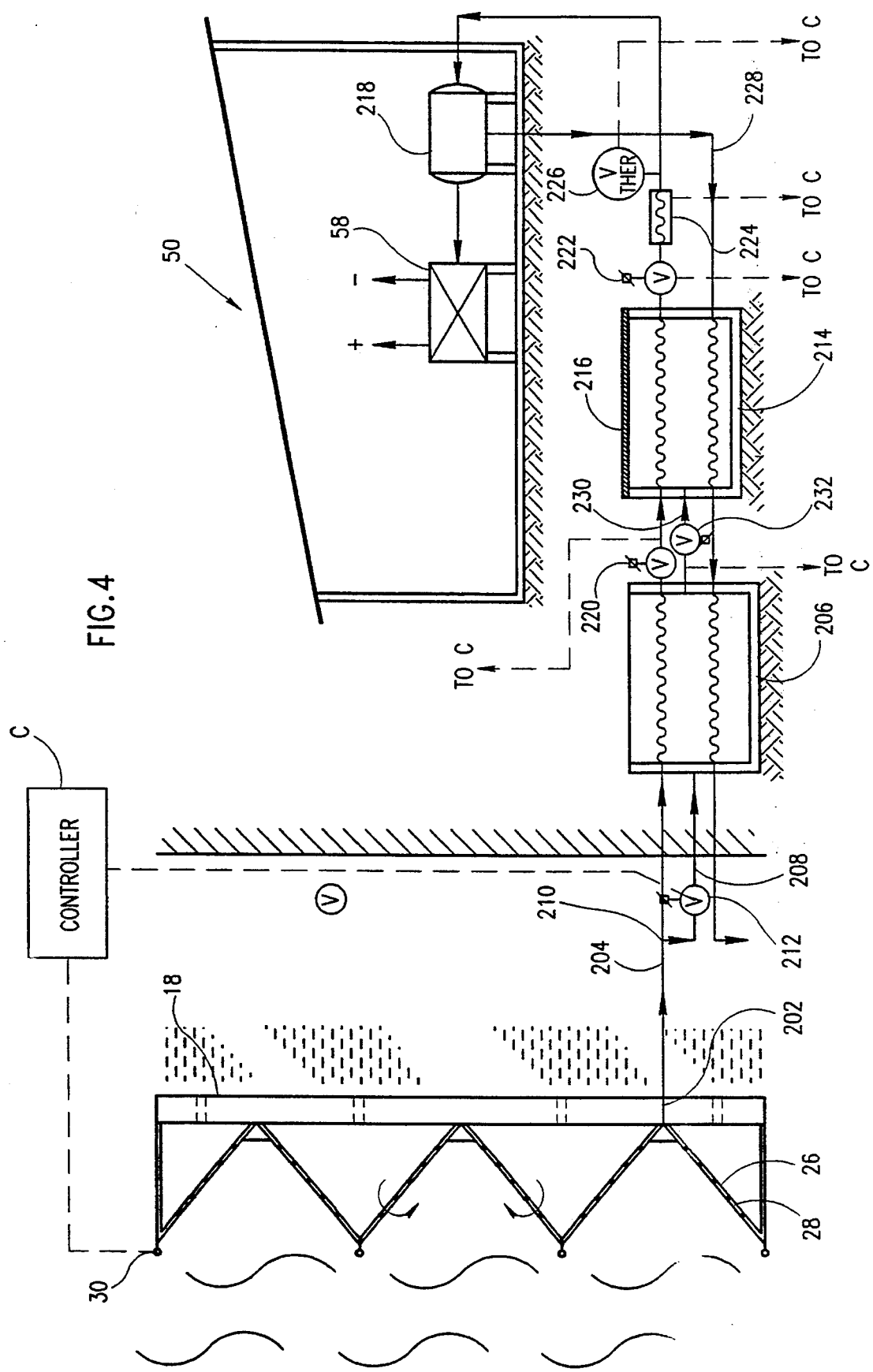
FIG. 4 is a schematic diagram of yet a further embodiment of the system of FIG. 1.

In a further embodiment of the invention, a solar distillation system, which is sited at or close to sea level, is appended. Referring to FIG. 4, a pipe outlet 202 is constructed within the inner wall 18 below the level of the concrete valve wall 28. A pipeline 204 transfers the sea water from upstream of inner wall 18 via an open cooling chamber 206. The pipeline 204 is split into first and second parallel pipelines 204 and 208 by means of a "T"-bend 210. A control valve 212, electrically coupled to computerized controls C, is inserted in second parallel pipeline 208 upstream of cooling chamber 206 in order to allow water to enter the cooling chamber 206. Pipeline 204 passes through solar heating chamber 214, which is covered by a protective covering 216 such as that manufactured by "Denflon" as manufactured by Kibbutz Dan, Israel in order to conserve the heat within the heating chamber 214. Pipeline 204 is connected to a turbine 218 which is sited within the electricity generating station 50. A control valve 222, an electrical heater 224 and a pressostat 226 are coupled to pipeline 204 downstream of the heating chamber 214. Pipeline 204 is filled with sea water and on opening control valve 220 the sea water within the pipeline passes through heating chamber 214 and is heated by the sun to a temperature below water's boiling point. The electrical heater 224 provides additional heating of the sea water, if required and the thermostat 226 controls the steam temperature being applied to the turbine 218 and the steam produced is used to drive the turbine 218.

A pipeline 230 also connects cooling chamber 206 with heating chamber 214 and through a control valve 232 controls the entry of sea water into the heating chamber 214. The turbine 218 is coupled to and drives generator 56. An outlet pipe 228 returns steam from the turbine 218 back through the heating chamber 214 and then through the cooling chamber 206. The process of heating and cooling removes the salt from the sea water and thus desalinated water can be extracted.

While the invention has been described with respect to a limited number of embodiments, it will be appreciated that many variations, modifications and other applications of the invention may be made.

What is claimed is:

1. A system for conversion of sea wave energy comprising:
   (a) a breakwater structure;
   (b) a wave energy collector integrally formed within said breakwater structure;
   (c) an upwardly extending duct having hydraulic oil separated from seawater by a separator, said energy collector being arranged to collect and direct oncoming waves to said duct for converting the wave energy into oil pressure;
   (d) a plurality of control valves electronically coupled through a computerized control system incorporated in said energy collector, said computerized control system regulating said control valves so that wave pressure is collected and transferred to said hydraulic oil;
   (e) a pressure tank;
   (f) a hydraulic motor mechanically coupled to an electric generator;
   (g) a piping system coupling said hydraulic oil in said duct to said pressure tank and said pressure tank to said hydraulic motor.

2. The system as claimed in claim 1, wherein the collection of wave energy is improved by means of a network of wave sensors attached to said breakwater structure at a distance therefrom and electrically coupled to said computerized control system.

3. The system as claimed in claim 1, wherein said control valves are two-way valves for releasing energy expended sea water back into the sea.

4. The system as claimed in claim 3, wherein released sea water is prevented from impeding incoming waves by means of drainage pipes.

5. The system as claimed in claim 1, wherein said hydraulic oil pressure tank is fitted with pressure relief valves for draining excess oil from the system.

6. The system as claimed in claim 1, wherein the system further comprises means for separating oil from water coupled to said piping system.

7. The system as claimed in claim 6, wherein said means for separating include filtration means.

8. The system as claimed in claim 1, further comprising solar distillation means associated with said wave energy collecting means, wherein the solar distillation means comprises cooling and heating means coupled to said breakwater structure and connected to a turbine mechanically coupled to an electric generator thereby producing electricity and wherein said heating and cooling means desalinate the sea water.

9. The system as claimed in claim 8, wherein said heating means comprises a chamber covered by a protective covering through which at least one pipeline, containing sea water pressured through said pipeline by said wave energy, is heated by the action of solar rays thereby producing steam which is used to drive said turbine.

10. The system as claimed in claim 8, wherein said heating means further comprises electrical heating elements to supplement the solar heating and thereby increase the quantity of steam produced.

11. The system as claimed in claim 8, wherein said cooling means comprises an open chamber through which at least one pipeline, containing steam expelled from said turbine, is cooled by the action of sea water.

* * * * *